May 2, 1967 J. P. BOTTEN 3,317,235
LOAD GRAB

Filed Jan. 18, 1965 4 Sheets-Sheet 1

INVENTOR.

BY JOHN P. BOTTEN

*Jack M. Young*
ATTORNEY

May 2, 1967     J. P. BOTTEN     3,317,235
LOAD GRAB

Filed Jan. 18, 1965     4 Sheets-Sheet 2

INVENTOR.
BY JOHN P. BOTTEN
*Jack M. Young*
ATTORNEY

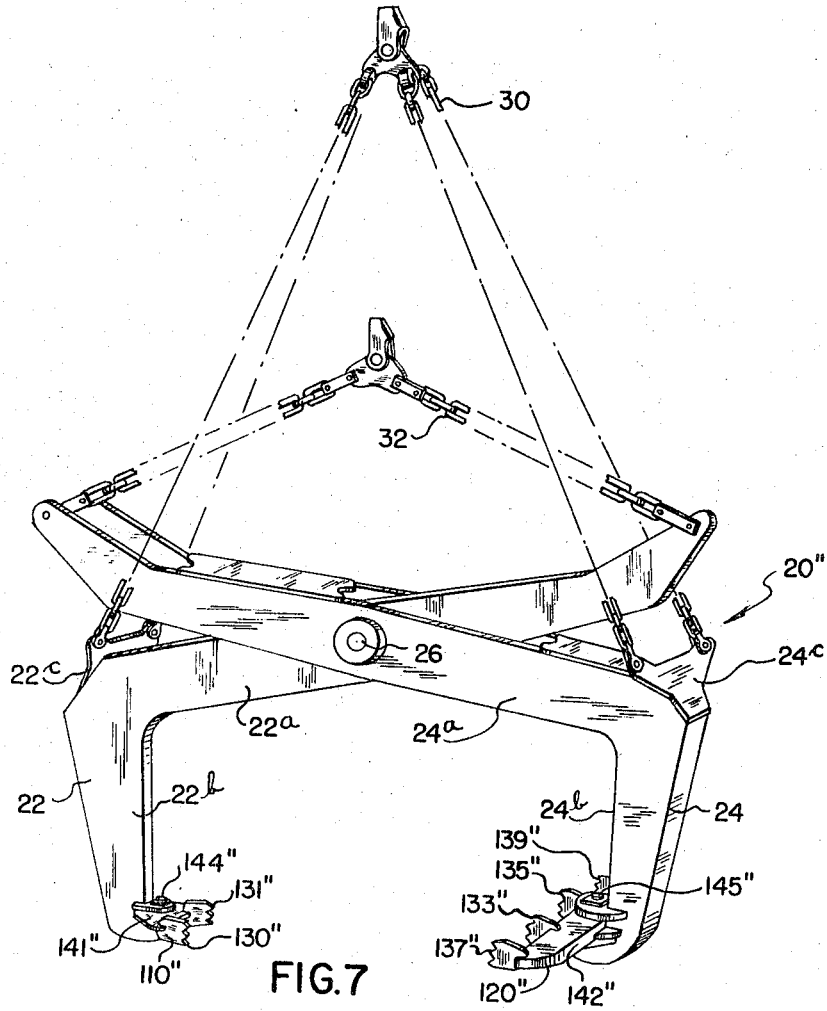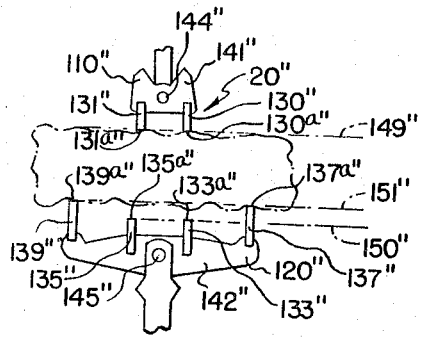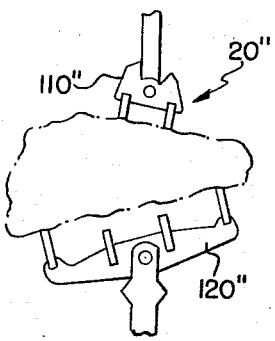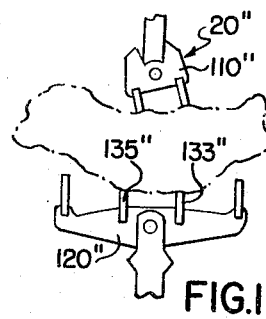

May 2, 1967  J. P. BOTTEN  3,317,235
LOAD GRAB

Filed Jan. 18, 1965

INVENTOR.
BY JOHN P. BOTTEN

Jack M. Young
ATTORNEY

United States Patent Office 3,317,235
Patented May 2, 1967

3,317,235
LOAD GRAB
John P. Botten, Rocky River, Ohio, assignor to The Owen Bucket Company, Cleveland, Ohio, a corporation of Ohio
Filed Jan. 18, 1965, Ser. No. 426,235
7 Claims. (Cl. 294—112)

The present invention relates to a load grab, and more especially a rock grab having at least three self-adjusting or self-aligning rock engageable points.

An object to the present invention is to provide a load grab of an "ice-tong" type.

A further object to the present invention is to provide a load grab having at least three self-adjusting or self-aligning load grab members, such as points.

A further object to the present invention is to provide a load grab characterized by its inexpensive manufacturing cost, structural simplicity, ease of assembly of its component parts, strong and sturdy nature, low operating cost, and ability to grab securely various sized irregularly shaped loads.

These and other objects of the present invention will become more fully apparent by reference to the appended claims as the following detailed description proceeds in reference to the accompanying drawings wherein:

FIG. 7 is a perspective view of a second form of grab of the type shown in FIG. 1;

FIGS. 11, 12 and 13 are bottom views of a portion of the grab in FIG. 7 showing the operation of the points and point bars in grasping irregularly shaped rocks of different sizes.

Although the grab disclosed herein may be used for grabbing any type load, it will be specifically described herein as a rock grab for grabbing a rock or stone as the load.

If one tries to grasp a rock by a grab having two jaws with three rigid points thereon, numerous difficulties will be encountered. The grab referred to has a single rigid point on one jaw and two rigid, spaced apart points on the other jaw. If this grab is closed upon an irregularly shaped stone, the stone may be gripped between two opposing points allowing it to spin until (1) it balances, (2) it comes into contact with some other part of the grab, or (3) it falls. This not only is dangerous, but also causes excessive wear on the points. Because of this problem, positioning this type three point grab on a stone is critical, and consequently, time consuming. The present invention provides a grab having at least three self-adjusting or self-aligning points adapted to adjustably and independently engage the face of a stone or load so that the placement of the grab is not as critical, and a safer and faster operation results. Other advantages of the grab disclosed herein will be discussed in more detail throughout the description hereafter, and especially at the end thereof.

Figure 1:
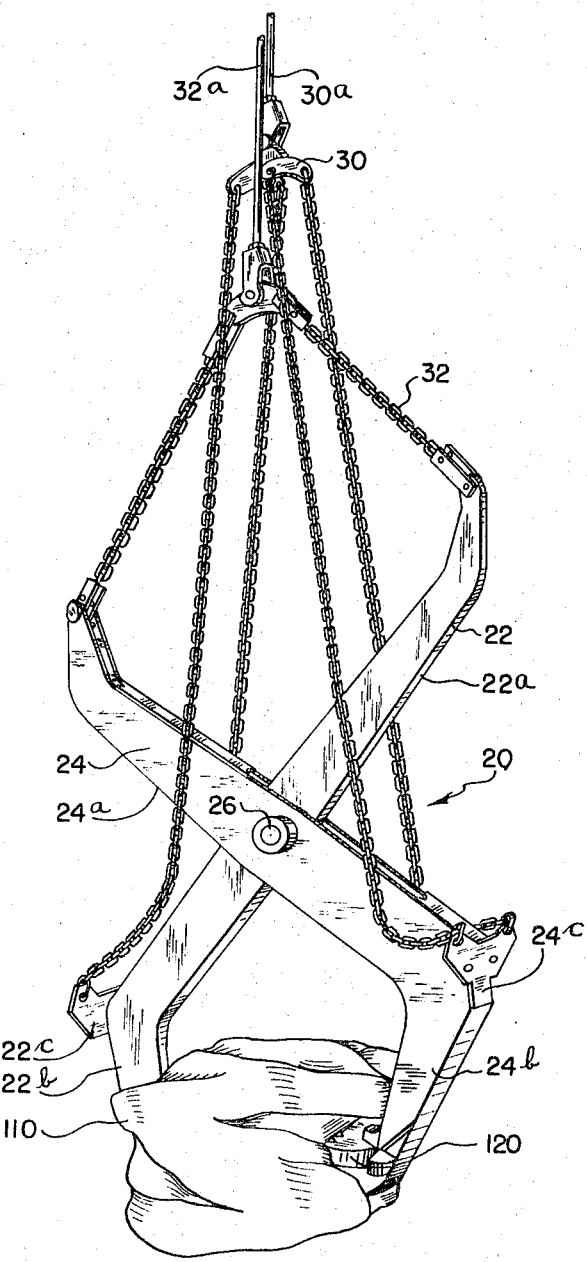
FIG. 1 is a perspective view of the grab of the present invention securely grabbing an irregularly shaped rock.

Load or rock grab 20 in FIG. 1 generically portrays the first form of grap 20' shown in FIGS. 2–6 and the second form of grab 20" shown in FIGS. 7–13, inclusive.

Each of these aforementioned grabs have the same basic "ice-tong" construction. Each includes two jaws 22 and 24 here shown as tongs but able to take any suitable form, such as tines, grabs, tongs, etc. Each of these jaws include two arms arranged in L-shape with these being long arm 22a and short arm 22b for jaw 22 and long arm 24a and short arm 24b for jaw 24. Pivot 26 connects together intermediate portions of long arms 22a and 24a of the L's to form means operatively connecting jaws 22 and 24 together for relative movement in a plane between jaws opened and closed positions, such as shown respectively in FIGS. 8 and 9. This pivot 26 cludes a large diameter main shaft rotating in a case hardened bushing in arm 22a. This plane of movement is in the plane of the drawings in FIGS. 3, 8, and 9 and is perpendicular to the plane of the drawings in FIGS. 4, 5, 6, 10, 11, 12 and 13. Holding yoke 30 joins the junctions 22c and 24c of the arms of these L's, and closing yoke 32 joins the distal ends of long L arms 22a and 24a. Each of these yokes 30 and 32 may be formed of chains and chain pins made of alloy steel for an ample safety factor and long life and can be normally furnished at their upper ends with either rope sockets or shackles, whichever is preferred.

Each jaw 22 or 24 has secured respectively to the distal end of its short L-arm 22b or 24b a load grab assembly generically shown in FIG. 1 as load grab assemblies 110 and 120 and specifically shown as first forms of load grab assemblies 110' and 120' in FIGS. 2–6 and as second forms of load grab assemblies 110" and 120" in FIGS. 7–13. These assemblies respectively include one or more load grab members, here shown as rock engageable points or pins 130'; 133' and 135'; 130" and 131"; and 133", 135", 137" and 139" with each of these points having a plurality of individual point portions (see the many point portions on point 130' in FIGS. 2 and 3). Each point is preferably welded either to a bar of an associated jaw, as will be described in more detail hereinafter, and is preferably made of alloy steel, heat treated for minimum wear for handling the hardest and most abrasive rocks. Load grab assembly 110' includes member 130' as a fixed point rigid with, such as being securely welded to, jaw 22 at the distal end of short arm 22b.

The other load grab assemblies in 120', 110" and 120" respectively include a moveable or pivoting bar 142', 141" and 142" rigidly connecting the aforesaid described associated two or more load grab member points. Bars 142' and 141" are short bars and bar 142" is a long bar. Each of these bars is secured at its midpoint respectively by pivot 145', 144" and 145" providing a pivotal connection pivotally connecting this load grab assembly to its associated jaw on an axis extending generally in the direction of the aforedescribed movement plane. Each of these pivotal connections provides: (1) a means movably mounting the one or more load grab members and associated assembly at a movement connection to its associated jaw for movement relative to the jaw; and (2) load grab members or points rigidly spaced apart and generally straddling this movement connection or pivot.

Figures 5, 6:
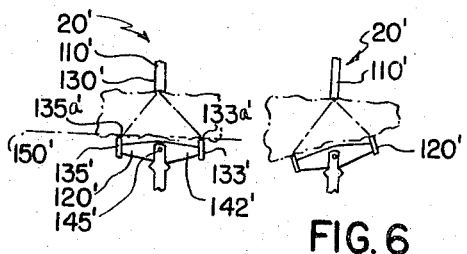
FIGS. 5 and 6 are bottom views of a portion of the grab in FIG. 2 showing operation of the points and point bar thereon in grasping irregularly shaped rocks.
Figure 3:
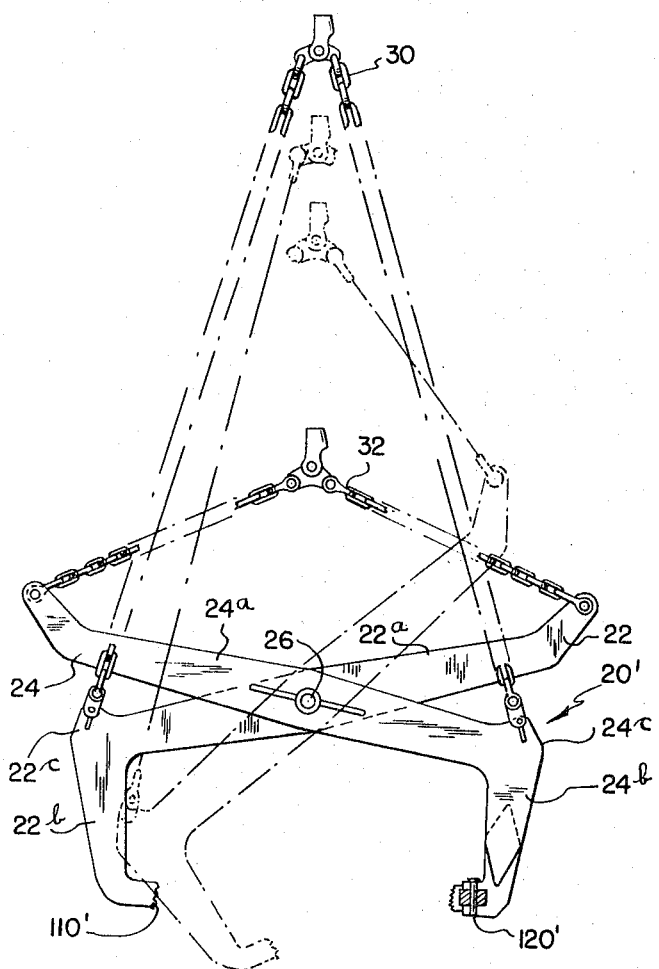
FIG. 3 is a side elevational view of the grab in FIG. 2 with one of the jaws thereof being shown in dot dash lines in closed position.
Figure 4:
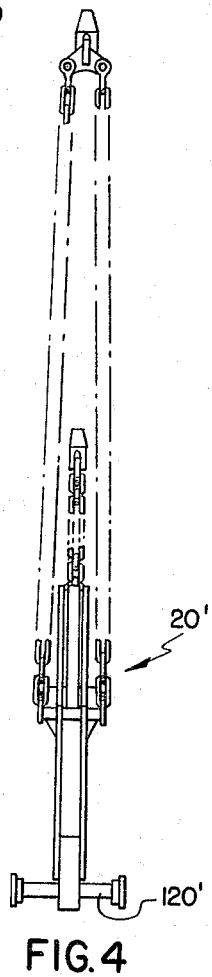
FIG. 4 is an end view of the grab in FIG. 2.
Figure 10:
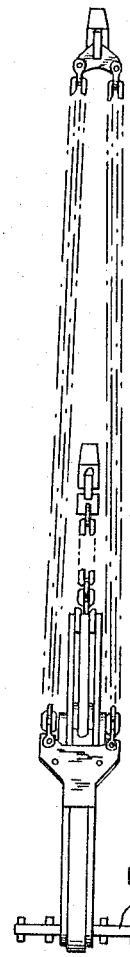
FIG. 10 is an end view of the grab in FIG. 7.
Figure 9:
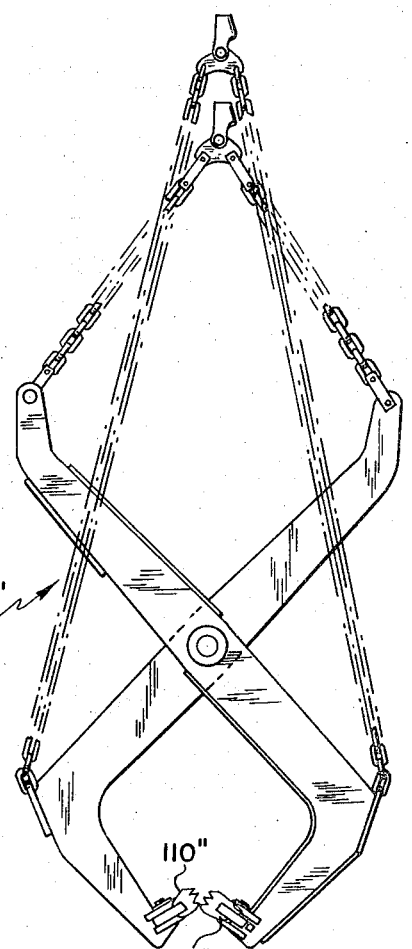
FIG. 9 is a side elevational view of the grab in FIG. 7 shown in closed position.
Figure 8:
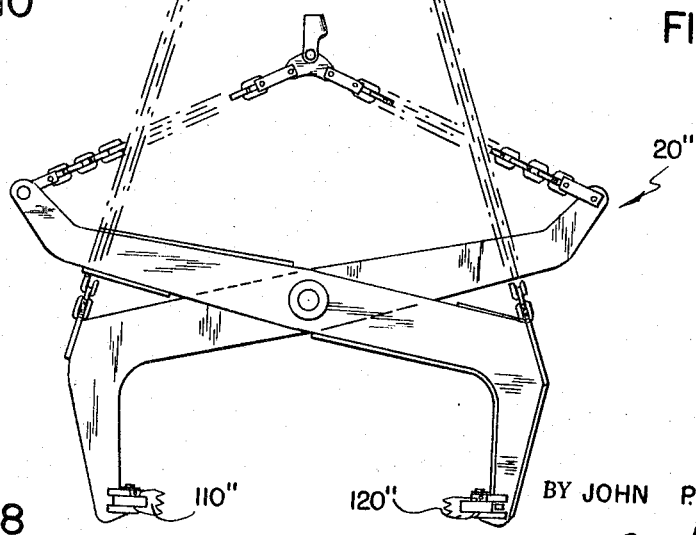
FIG. 8 is a side elevational view of the grab in FIG. 7 shown in open position.

FIGS. 5, 6, 11, 12 and 13 reveal that these points are self-adjusting or self-aligning points for firmly grabbing many different types of irregularly shaped rocks. In FIGS. 5 and 6, rigid point 130' coacts with two moveable points 133' and 135'. In FIGS. 11–13, two moveable points 130" and 131" coact with either of two pairs of moveable points—either point pair 133" and 135" or point pair 137" and 139".

In FIGS. 5 and 11, the pairs of load grab members have load engaging portions spaced apart along a line adapted to be oriented perpendicular to the aforedescribed movement plane. These include respectively load engaging portions 133a' and 135a'; 130a" and 131a"; and 133a", 135a", 137a" and 139a" on load grab member points 133' and 135'; 130" and 131"; and 133", 135", 137" and 139" spaced apart along lines 150', 149", 150" and 151" adapted to be oriented perpendicular to this movement plane. Also, note that line 149" in FIG. 11 is adapted to be located generally parallel to line 150" or 151", depending upon the location of the load grab assemblies on pivots 144" and 145". Also, note that line 150" for the inner pair of load engagement portions 133a" and 135a" is parallel to, but closer to pivot connection 145", than the corresponding line 151" for outer pair of load engagement portions 137a" and 139a".

When replacement of any of these points is necessary, such as after excessive wear, it is simply a matter of removing the pivot pin 145', 144" or 145" and installing a new bar; or if desired, burning off the old point, such as fixed point 130', and welding a new point in place thereof.

The disclosed rock grab is for picking up and placing stones one at a time, especially large stones. It can be operated from any crane that can operate a conventional two or three line clamshell bucket. Each form of this rock grab is of simple construction to grab securely and quickly irregularly shaped rocks by having at least all three points make positive contact with the rock because these points are self-adjusting or self-aligning. In contrast, compare the difficulties, described earlier in this application and immediately after the description of the figures of the drawings, encountered in grasping a rock by two jaws having three rigid points.

The second form of load grab member can grab either a small load or a large load. The inner points or pins 133" and 135" are used for grabbing a small load in FIG. 13 while the outer pair of pins or points 137" and 139" are used for grabbing a large load in FIG. 11 and to prevent the large load or rock from spinning.

This grab was developed with two main objectives in mind: (1) to have a basic three-point grab wherein all basic three points make positive contact with irregular faces of the stone or rock, and (2) to keep the design as simple as practical.

Here are some of the outstanding advantages of this load grab:

(1) Light weight.
(2) Positive, safe grip.
(3) Easy to handle.
(4) Low manufacturing cost.
(5) Low maintenance expense, and minimum number of parts.
(6) Easy to hook-up.

This grab operates in the same way as a conventional clamshell bucket with a closing line and a holding line, here generically shown as lines 30a and 32a in FIG. 1. The grab is lowered down into position over the rock by holding line 30a. When it is positioned properly with respect to the rock, a pull on closing line 32a will engage at least three points with the rock to securely grab the rock; and a continuing pull on the closing line will raise the rock. Release of the closing line will permit the grab to lower the rock to its new resting position, and further release of the closing line after the rock reaches its new position will open the grab jaws to release the rock. However, this grab has an important distinction over the clamshell bucket. The closing line does not have to be reeved around sheaves. This makes installation simple and greatly increases the wear life of the line, such as a wire rope. The design of this rock grab is very basic, which keeps the initial cost to a minimum and limits maintenance to a very few parts. Mechanically, this results in a high strength grab with minimum weight for its lifting capacity. This grab is designed along the lines of a simple "ice-tong" to eliminate the head, corner bars, lower center section, sheaves, and many other parts found in other rock grabs.

To assure a positive rock grip, even on very irregular rocks, the individual tooth points are welded to pivoting bars. This pivoting feature also eliminates the severe twisting that damages clamshell buckets and clamshell type rock grabs with fixed points.

Figure 2:
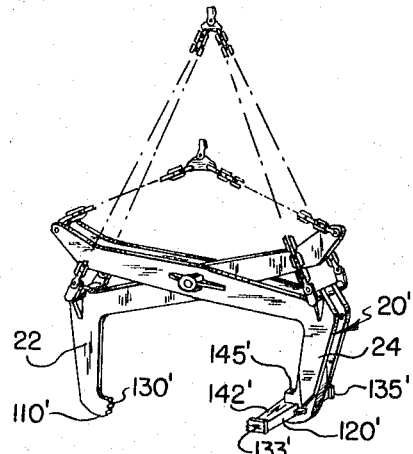
FIG. 2 is a perspective view of a first form of the grab in FIG. 1 in an open position.

Although pivot 145' in FIGS. 2, 5 and 6 and pivots 144" and 145" in FIGS. 7, 11, 12 and 13 each extend generally vertically (in the plane of jaw movement) during use of these grabs, it should be readily apparent that these pivots may be inclined to the horizontal (inclined to this plane at an acute angle), or actually horizontal (perpendicular to this plane), and many of the same advantages of this self-adjusting or self-aligning three-point rock grab action will be obtained. However, there is an increased advantage to the pivot axis alignments illustrated in the drawings because: (1) it provides greater stability against rock spinning, (2) each point carrying bar has a larger range of movement permitting it to accommodate to a wider range of rock sizes, (3) these pivoting bars are easier to manufacture and can be shaped to better conform to the needs of the rocks grabbed because the bar does not have to be shaped to conform to the shape of the jaw or for jaw movement.

The invention may be embodied in other specific forms without departing from the spirit or essential characteristics thereof. The present embodiments are therefore to be considered in all respects as illustrative and not restrictive with the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. A load grab, comprising
   two jaws,
   means operatively connecting said jaws for relative movement in a plane between jaws closed and open positions,
   one of said jaws having a first load grab assembly including at least one load grab member,
   the other of said jaws having a second load grab assembly including at least two load grab members,
   means movably mounting said two load grab members and second assembly at one movement connection to said other jaw for movement relative to said other jaw,
   said two load grab members being rigidly spaced apart and generally straddling said movement connection,
   said second load grab assembly including an inner and an outer pair of rigidly spaced apart load grab members with the two members in each pair generally straddling said connection,
   the load engagement portions for said inner pair extending along a line generally parallel to but closer to said connection than the corresponding line for said outer pair,
   whereby said one load grab member can grab either a small load with said inner pair or a large load with said outer pair.

2. A load grab, comprising
   two jaws,
   means operatively connecting said jaws for relative movement in a plane between jaws closed and open positions,
   one of said jaws having a first load grab assembly including at least one load grab member,
   the other of said jaws having a second load grab assembly including at least two load grab members,
   means movably mounting said two load grab members and second assembly at one movement connection to said other jaw for movement relative to said other jaw, said two load grab members being rigidly spaced apart and generally straddling said movement connection, said movement connection being a pivotal connection pivotally connecting said second assembly to said other jaw on an axis extending generally in the direction of said movement plane, and means preventing pivotal movement of said second load grab assembly in said movement plane to prevent dropping said load.

3. A load grab, as set forth in claim 2, with said load grab being a rock grab, each of load grab members being a rock engageable point, said second assembly including a bar rigidly connecting said two load grab member points with clearance between said bar and a line connecting said two points for receiving a projection of a rock therein.

4. A load grab, as set forth in claim 3, with each rock engageable point including a plurality of point portions extending as a serrated edge in the same direction as said movement plane for firmly engaging the rock.

5. A load grab, as set forth in claim 2, with said two jaws and the operative connection means there-between forming tongs, each jaw including two arms arranged in L-shape, said means operatively connecting said jaws including a single pivot connecting together intermediate portions of the long arms of the L's, each assembly being secured to the distal end of its short L arm, a closing yoke joining the distal ends of the long L arms, and a holding yoke joining the junctions of the arms of each L.

6. A load grab, comprising two jaws, means operatively connecting said jaws for relative movement in a plane between jaws closed and open positions, one of said jaws having a first load grab assembly including at least one load grab member, the other of said jaws having a second load grab assembly including at least two load grab members, means movably mounting said two load grab members and second assembly at one movement connection to said other jaw for movement relative to said other jaw, said two load grab members being rigidly spaced apart and generally straddling said movement connection, said movement connection being a pivotal connection pivotally connecting said second assembly to said other jaw on an axis extending generally in the direction of said movement plane, said one load grab member being rigidly secured to said one jaw, said axis and said one load grab member point lying in said movement plane, whereby said rock grab is of simple construction to grab securely and quickly irregular rocks by having all three points make positive contact with this rock.

7. A load grab, as set forth in claim 2, with said load grab being a rock grab, each of load grab members being a rock engageable point, said second assembly including a bar rigidly connecting said two load grab member points with clearance between said bar and a line connecting said two points for receiving a projection of a rock therein, each rock engageable point including a plurality of point portions extending as a serrated edge in the same direction as said movement plane for firmly engaging the rock, said two jaws and the operative connection means therebetween forming tongs, each jaw including two arms arranged in L-shape, said means operatively connecting said jaws including a single pivot connecting together intermediate portions of the long arms of the L's, each assembly being secured to the distal end of its short L arm, a closing yoke joining the distal ends of the long L arms, and a holding yoke joining the junctions of the arms of each L.

References Cited by the Examiner

UNITED STATES PATENTS

| | | |
|---|---|---|
| 171,413 | 12/1875 | Nelson. |
| 393,680 | 11/1888 | Wiley _____ 294—112 |
| 1,141,916 | 6/1915 | Aderer _____ 81—419 X |
| 1,189,107 | 6/1916 | Hesock _____ 81—418 X |
| 1,617,703 | 2/1927 | Christianson _____ 81—424 X |
| 2,326,962 | 6/1942 | Meier. |
| 2,779,224 | 1/1957 | Coggburn _____ 81—424 X |
| 3,061,357 | 6/1959 | Wright _____ 81—424 X |

HUGO O. SCHULZ, *Primary Examiner.*